J. W. BALES.
POWER TRANSMITTING DEVICE FOR ENGINES.
APPLICATION FILED MAR. 6, 1917.

1,246,036.

Patented Nov. 13, 1917.

Witnesses

J. W. Bales, Inventor by

Attorneys

UNITED STATES PATENT OFFICE.

JAMES WILLIAM BALES, OF ELDORA, IOWA.

POWER-TRANSMITTING DEVICE FOR ENGINES.

1,246,036. Specification of Letters Patent. Patented Nov. 13, 1917.

Application filed March 6, 1917. Serial No. 152,818.

*To all whom it may concern:*

Be it known that I, JAMES W. BALES, a citizen of the United States, residing at Eldora, in the county of Hardin and State of Iowa, have invented a new and useful Power-Transmitting Device for Engines, of which the following is a specification.

The present invention appertains to mechanisms for transmitting power from steam and internal combustion engines, and aims to provide a novel and improved mechanism of that character applicable to various engines, and operable for transmitting the power in an efficient and satisfactory manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
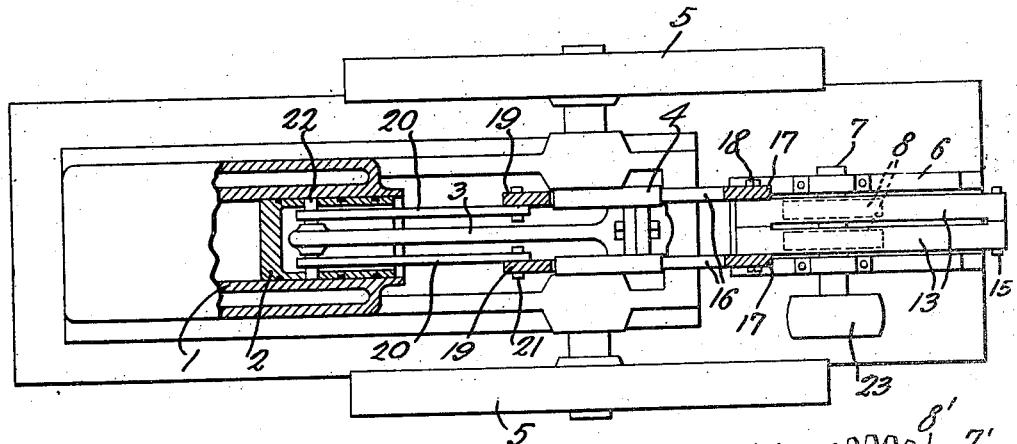
Figure 1 is a plan view of an engine illustrating the present mechanism applied, portions being broken away and shown in section.
Figure 3:
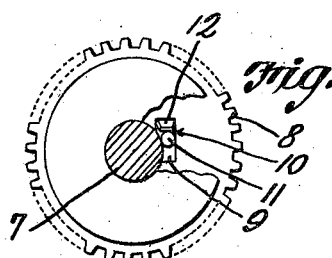
Fig. 3 is a detail view illustrating one of the ratchet devices for the pinions.

The engine illustrated embodies the cylinder 1 in which a piston 2 works, the piston being connected by a connecting rod 3 with the crank of a crank shaft 4 having the fly wheel or wheels 5 mounted thereon.

The present mechanism can be constructed as a unitary part of the engine, or as an attachment, it being illustrated in the latter form. The device embodies a secondary bed or frame 6 upon which a shaft 7 is journaled for rotation, and a pair of pinions 8 is mounted loosely upon said shaft, the pinions being disposed side by side. Reversed ratchet devices are disposed between the pinions and shaft 7. Thus, each pinion is provided with one or more recesses 9 providing the surfaces 10, and rollers or rolling dogs 11 are disposed between the shaft 7 and surfaces 10, being moved into wedged engagement with said surfaces and shaft by suitable springs 12 confined between the ends of the recesses 9 and the rollers 11. When each pinion is rotated in one direction, the roller 11 thereof will bind between the surface 10 and shaft 7, thereby causing the shaft to turn with the pinion, but when the pinion is rotated in the opposite direction, there will be a tendency for the surface 10 to be moved away from the roller 11, thereby permitting the pinion to rotate without rotating the shaft 7 with it. The ratchet devices of the two pinions being reversed, causes the shaft to be rotated in one direction as the pinions are given an oscillatory or alternating rotary movement.

A pair of open rectangular frames 13 are disposed side by side over the respective pinions, one frame having a series of rack teeth 14 along one of its longitudinal members and the other frame having radial rack teeth along the opposite longitudinal member, said rack teeth meshing with the two pinions. The free ends of the frames 13 are fastened together by bolts 15 or the like, and the other ends of the frames are secured to a pair of ring-shaped yokes 16 which surround the crank of the crank shaft 4. The yokes 16 are provided with the outstanding portions 17 between which the respective ends of the frames 13 are clamped by means of bolts 18 or other securing elements.

The yokes 16 are provided opposite the portions 17 with outstanding portions 19 to which arms 20 are secured in alinement with the frames 13 by means of bolts 21, or the like. The arms 20 are engaged with the wrist pin 22 of the piston 2 or with any other reciprocating part, whereby the reciprocatory movement of the piston will be transmitted by the arms 20 to the yokes 16 and frames 13.

A pulley wheel 23 or other suitable device is secured to the shaft 7 for transmitting the power therefrom to the machine or appliance which is operated by the engine.

Instead of taking the power from the crank shaft 4 as usual, the power is taken from the shaft 7, the crank shaft being employed for assuring of the reciprocation of the piston, especially in internal combustion engines. As the piston 2 reciprocates, the frames or racks 13 are reciprocated, and the pinions 8 are thus rotated in opposite directions with an alternating movement. When the racks are moved in one direction, one pinion in being rotated will through the medium of its ratchet device rotate the shaft 7, whereas when the racks move in the opposite direction, the other pinion will through the medium of its ratchet device rotate the shaft 7 in the same direction. The reciprocatory movement of the present attachment is therefore utilized for imparting a practically continuous rotary movement to the shaft 7. The power is not transmitted through a crank as usual, thereby providing for a uniform leverage from the reciprocating part to the rotating part. The reciprocatory part of the present attachment requires no other supports than the pinions 8 and wrist pin or other reciprocatory member 22.

Figure 4:
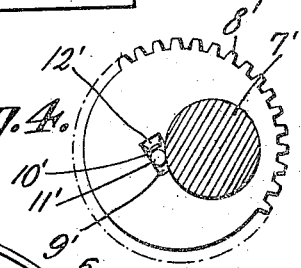
Fig. 4 is a view similar to Fig. 3 illustrating a modification.
Figure 2:
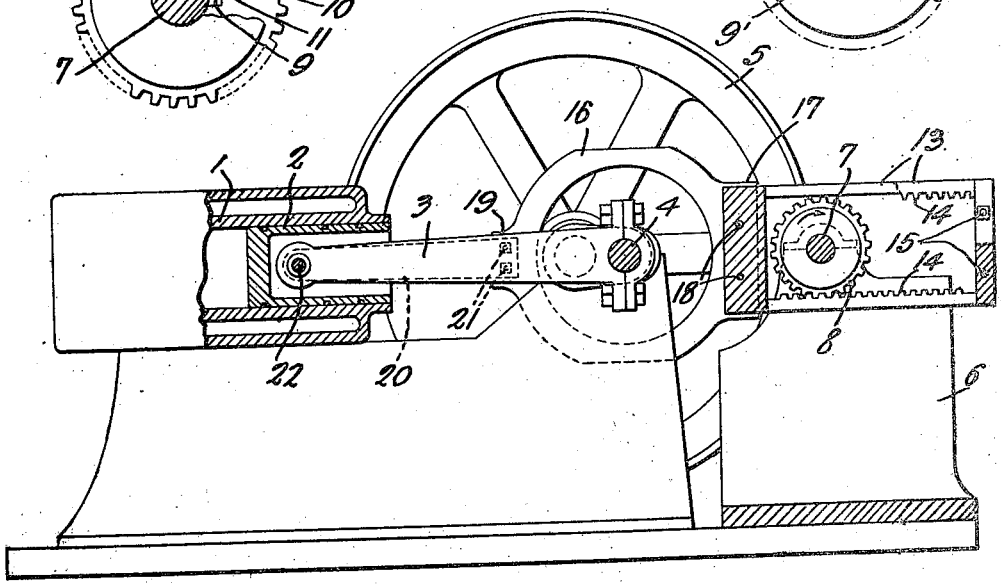
Fig. 2 is a side elevation, portions being broken away and shown in section.

Instead of the gears or pinions 8 being concentric upon the shaft 7, they can be eccentric, as shown in Fig. 4. Thus, the pinions 8' are mounted eccentrically upon the shaft 7', and the thicker portion of the pinion is provided with the recess 9' in which the roller 11' works along the oblique surface 10' thereof, a spring 12' moving the roller toward the shaft. By using these eccentric pinions, those portions thereof of shorter radius can mesh with the racks, when the connecting rod is at the ends of its strokes, in which positions the piston 2 and parts of the present device have the slowest movement, while the portions of the pinions of greater radius will come into mesh with the racks as the connecting rod is between the ends of its movement. This will give the shaft 7' a more uniform rotation, to compensate for the crank motion. Thus, as the speed of the reciprocating parts increases, the distance between the shaft 7' and racks will increase, and as the speed of the reciprocating parts decreases, the space between the shaft 7' and racks decreases, thereby maintaining a practically constant speed of rotation of the shaft 7'.

Having thus described the invention, what is claimed as new is:—

1. In a mechanism of the character described, the combination with an engine including a cylinder, a piston working therein, a crank shaft, a connecting rod connecting said crank shaft and piston, and a fly wheel carried by the crank shaft, of a second shaft, a pair of pinions mounted loosely on the second shaft, reversed ratchet devices between said pinions and second shaft, a yoke surrounding the crank shaft, racks connected to said yoke and engaging said pinions, and means connecting said yoke and piston.

2. In a mechanism of the character described, the combination with an engine having a cylinder, a piston working therein, a crank shaft, a connecting rod connecting said crank shaft and piston, and a fly wheel on the crank shaft, of a second shaft, a pair of pinions mounted loosely on the second shaft, reversed ratchet devices between said pinions and shaft, a pair of yokes surrounding the crank of the crank shaft, racks connected to said yokes and mounted on said pinion in engagement therewith, and arms attached to the yokes opposite to said racks and connected with said piston.

In testimony that I claim the foregoing as my own, I have hereto affixed my signature in the presence of two witnesses.

JAMES WILLIAM BALES.

Witnesses:
   CHAS. BRIBESHEIMS,
   G. H. GEERDES.

Copies of this patent may be obtained for five cents each, by addressing the "Commissioner of Patents, Washington, D. C."